(12) United States Patent
Bollaert et al.

(10) Patent No.: US 8,741,181 B2
(45) Date of Patent: Jun. 3, 2014

(54) METHOD AND APPARATUS FOR TREATING A RAW UCG PRODUCT STREAM

(75) Inventors: Grant Bollaert, Brisbane (AU); Ernest Du Toit, Brisbane (AU)

(73) Assignee: Linc Energy Ltd, Brisbane, Queensland (AU)

( * ) Notice: Subject to any disclaimer, the term of this patent is extended or adjusted under 35 U.S.C. 154(b) by 0 days.

(21) Appl. No.: 14/003,444

(22) PCT Filed: Dec. 23, 2011

(86) PCT No.: PCT/AU2011/001692
§ 371 (c)(1),
(2), (4) Date: Sep. 5, 2013

(87) PCT Pub. No.: WO2012/119183
PCT Pub. Date: Sep. 13, 2012

(65) Prior Publication Data
US 2013/0336861 A1    Dec. 19, 2013

(30) Foreign Application Priority Data
Mar. 9, 2011  (AU) .............................. 2011900848

(51) Int. Cl.
*C01B 3/02* (2006.01)
*C10J 3/46* (2006.01)
*C10J 3/48* (2006.01)

(52) U.S. Cl.
USPC .............. 252/373; 48/197 R; 48/202; 48/210; 48/128; 48/61; 48/DIG. 6

(58) Field of Classification Search
USPC .......... 252/373; 48/197 R, 202, 210, 128, 61, 48/DIG. 6
See application file for complete search history.

(56) References Cited

U.S. PATENT DOCUMENTS

| | | | |
|---|---|---|---|
| 4,007,017 A * | 2/1977 | Slater et al. ................. | 48/197 R |
| 4,114,688 A | 9/1978 | Terry | |
| 4,303,127 A | 12/1981 | Freel et al. | |
| 4,385,906 A | 5/1983 | Estabrook | |
| 8,562,701 B2 * | 10/2013 | Heidenreich et al. ........ | 48/197 R |
| 2013/0336861 A1 * | 12/2013 | Bollaert et al. ............... | 423/210 |

OTHER PUBLICATIONS

AU 2012-101,392 A4 Oct. 11, 2012 (abstract only).*
International Search Report, mailed Apr. 19, 2012, for corresponding International Application No. PCT/AU2011/001692, 5 pages.
International Preliminary Report on Patentability, mailed Jun. 21, 2013, for corresponding International Application No. PCT/AU2011/001692, 9 pages.

* cited by examiner

*Primary Examiner* — Timothy Vanoy
(74) *Attorney, Agent, or Firm* — Klarquist Sparkman, LLP

(57) ABSTRACT

This invention relates to a method and apparatus for treating a raw product stream (raw synthesis gas/raw syngas) generated by underground coal gasification (UCG). In one aspect, the invention concerns a method and apparatus for cooling and initial cleaning of raw syngas gas, so that the treated UCG product stream is suitable for downstream applications such as for energy or chemical production. In another aspect, the invention concerns a method and apparatus for isolating, treating and handling a raw UCG product stream that is generated either when igniting or decommissioning an underground coal gasifier and, due to its consistency, is generally unsuitable for energy or chemical production.

13 Claims, 6 Drawing Sheets

METHOD AND APPARATUS FOR TREATING A RAW UCG PRODUCT STREAM

CROSS REFERENCE TO RELATED APPLICATIONS

This is the U.S. National Stage of International Application No. PCT/AU2011/001692, filed Dec. 23, 2011, which in turn claims the benefit of and priority to Australian Patent Application No. AU2011900848, filed Mar. 9, 2011.

TECHNICAL FIELD

This invention relates to a method and apparatus for treating a raw product stream (raw synthesis gas/raw syngas) generated by underground coal gasification (UCG). In one aspect, the invention concerns a method and apparatus for cooling and initial cleaning of raw syngas gas, so that the treated UCG product stream is suitable for downstream applications such as for energy or chemical production. In another aspect, the invention concerns a method and apparatus for isolating, treating and handling a raw UCG product stream that is generated either when igniting or decommissioning an underground coal gasifier and, due to its consistency, is generally unsuitable for energy or chemical production.

BACKGROUND ART

A raw product stream (raw syngas) is generated by UCG of which syngas is a major and desirable constituent. Syngas will contain different proportions of $CO$, $H_2$, $CO_2$, $N_2$, $CH_4$, water and gaseous hydrocarbons depending on various factors including the type of oxidant used for UCG, water influences (both ground water and exogenous water), coal quality, and UCG operating temperature and pressure. Furthermore, a raw UCG product stream generated soon after igniting a coal gasifier or when decommissioning a coal gasifier will tend to have an unsuitable consistency (chemical or calorific) for energy or chemical production.

The raw UCG product stream will contain components that must be removed or otherwise treated prior to being suitable as a syngas stream (treated UCG product stream) to be used as a feedstock for gases to liquids (GTL), hydrogen cell or power production.

A typical raw UCG product stream will contain:
main syngas components ($CO$, $H_2$, $CO_2$, $N_2$, $CH_4$);
water;
minor components such as $C_2$-$C_6$ hydrocarbons, oxygen and argon; and
contaminants such as sulphur containing components (eg. $H_2S$, $COS$, $CS_2$, mercaptans), nitrogen based components ($NH_3$, $HCN$), hydrocarbon components (coal condensate and phenols), trace components such as heavy metals (arsenic and mercury), and chlorides.

These contaminants originate from the coal itself or its gasification, or from the exogenous oxidant. Some contaminants are particularly inhibitory to downstream catalytic reactions, such as in the GTL process, in which case it is vital that they be removed from the raw UCG product stream or otherwise treated. In some instances, however, the contaminants themselves may be isolated, refined and worked up as commercial by-products (eg. natural gas, methanol, ammonia, elemental sulphur, oxo alcohols and carbon dioxide).

DETAILED DESCRIPTION OF THE INVENTION

It is an object of the present invention to provide a method or apparatus for the initial treating and handling of a raw UCG product stream (raw syngas) such that the treated UCG product stream (syngas) is usable as a feedstock for energy or chemical production.

According to a first aspect of the present invention, there is provided an apparatus for treating and cooling a raw UCG product stream, said apparatus comprising:
a particulate removal system for removing particulates from the raw UCG product stream;
a water removal system for removing water from the raw UCG product stream; and
a condensed hydrocarbon removal system for removing hydrocarbon condensates from the raw UCG product stream.

According to a second aspect of the present invention, there is provided a method for treating and cooling a raw UCG product stream, said method comprising the steps of:
passing the raw UCG product stream through a particulate removal system for removing particulates entrained in the raw UCG product stream;
passing the raw UCG product stream through a water removal system for removing water from the raw UCG product stream; and
passing the raw UCG product stream through a condensed hydrocarbon removal system for removing condensed hydrocarbon from the raw UCG product stream.

The steps mentioned above need not be carried out in the specified order.

The particulate removal system can be of any suitable size, shape and construction, and can consist of any suitable material or materials. The particulate removal can be done in two stages; the first to remove larger particles, and the second to remove the very fine particulates that remain in the gas stream after the first stage. Examples of suitable particulate removal systems include hot candle filters (removal of particulates as a dry solid) and water scrubbers (removal of particulates as a slurry). Examples of yet other suitable particulate removal systems include separators, such as cyclone separators or cyclone separators employing water scrubbers. Preferably, the particulate removal system can reduce the particulate content of the raw UCG product stream to a level below about 1 $mg/Nm^3$, but the actual required level of course will depend on the intended use for the treated raw UCG product stream.

The water removal system can be of any suitable size, shape and construction, and can consist of any suitable material or materials. Examples of suitable water removal systems include condensers and separators, such as cyclone separators. Preferably, the water removal system can reduce the water/water vapour content of the raw UCG product stream to a level below about 4 vol %, but the actual required level of course will depend on the intended use for the treated raw UCG product stream.

The water removal system can allow re-use of any removed water as a cooling agent for the production well through re-injection thereof.

The condensed hydrocarbon removal system can be of any suitable size, shape and construction, and can consist of any suitable material or materials. Examples of suitable condensed hydrocarbon removal systems include condensers and cyclone separators. Preferably, the condensed hydrocarbon removal system can reduce the condensed hydrocarbon content of the raw UCG product stream to a level below about 1 vol %, but the actual required level of course will depend on the intended use for the treated raw UCG product stream.

The particulate, water and/or condensed hydrocarbon removal systems can be separate systems or integrated within the one system.

For application of multiple gasifier operation, the particulate removal system can be separate and duplicated to allow for independent start-up and decommissioning of the individual gasifiers, while the water and/or condensed hydrocarbon removal systems can be shared by the multiple gasifiers. Alternatively, each gasifier could have its own systems.

In a preferred embodiment, the particulate, water and condensed hydrocarbon removal systems are in the form of a cyclone separator, or two or more cyclone separators arranged in sequence or in parallel, in combination with wet scrubbing.

In one embodiment, the removal system comprises a vapour-liquid/solid separator having a top and a bottom. The separator can have an outlet for gas located at a top of the vessel and an outlet for liquid located at the bottom of the vessel.

The separator can comprise a gas feed inlet tangential to a wall of the vessel to allow for centrifugal forces to enhance gas-liquid separation, or alternatively an internal impingement plate for directing a raw UCG product stream feed to the vessel bottom.

The separator can comprise a vessel top section detachably connected to a vessel bottom section.

The separator can comprise a basket strainer housed within the bottom section of the vessel. Large solid particles can be retained by the basket strainer. If disconnected from the top section, the basket strainer can be accessed and emptied.

The separator can comprise a hydraulic arm connected to the bottom section of the vessel, for moving the bottom section relative to the vessel top section between a close and open position. In the open position the strainer basket can be accessed and emptied.

Observing a differential pressure measurement across the strainer may indicate that the basket strainer requires emptying.

In another embodiment, the removal system comprises a water quench and scrubber system which may have the primary function of removing entrained fine particulates and liquids (water and coal/hydrocarbon condensates) from the raw UCG product stream The secondary function may be to cool the raw UCG product stream by means of direct contact in order to remove more coal condensates and water from the product stream without heat exchanger fouling issues.

The water quench and scrubber system may comprise a venturi scrubber connected to a cyclonic spray scrubber. The venturi scrubber can comprise a venturi pipe comprising a converging section, a throat section and a diverging section. Water can be injected via a water supply line into the venturi pipe just prior to the throat section. Raw UCG product stream entering the converging section can come in contact with the injected water of the supply line and mix with water droplets to removed particulates from the product stream prior to the product stream reaching the cyclonic spray scrubber. A flow control system can control the injection of water into the venturi pipe.

The cyclonic spray scrubber can comprise a vertically orientated vessel as well as a gas feed inlet at a bottom of the vessel that is connected to the venturi pipe diverging section. The cyclonic spray scrubber can have a gas outlet located at a top of the vessel for a spray scrubber-separated product stream. The cyclonic spray scrubber can have a demister/grid pad located at the outlet for removing entrained water droplets. The cyclonic spray scrubber can have an outlet for liquid located at the bottom of the vessel.

The cyclonic spray scrubber can comprise a spray system for further cooling of the UCG product stream as it swirls upwardly from the inlet to the outlet. Further cooling removes more contaminants from the product gas stream. The spray system can have a manifold and nozzles for spraying water towards walls of the vessel and swirling gas, so that contaminants captured within the spray are directed down towards the vessel's bottom. The cyclonic spray scrubber can comprise a temperature control whereby exiting gas temperature determines the required duty of connected air coolers.

According to a third aspect of the present invention, there is provided an apparatus for treating a raw UCG product stream, said apparatus comprising:

a pipe assembly for conveying a raw UCG product stream from a production well of an underground coal gasifier to a first raw UCG product stream treatment system and a second raw UCG product stream treatment system, said pipe assembly comprising at least one inlet for a raw UCG product stream from the production well and at least two outlets for the raw UCG product stream, wherein a first of said two outlets is connectable to the first raw UCG product stream treatment system and a second of said two outlets is connectable to the second raw UCG product stream treatment system; and a diverter associated with the pipe assembly for diverting the raw UCG product stream to either the first outlet or the second outlet.

According to a fourth aspect of the present invention, there is provided a method for treating a raw UCG product stream, said method comprising the steps of:

connecting an inlet of a pipe assembly to a production well of an underground coal gasifier;

connecting a first outlet of the pipe assembly to a first raw UCG product stream treatment system;

connecting a second outlet of the pipe assembly to a second raw UCG product stream treatment system; and using a diverter associated with the pipe assembly to divert the raw UCG product stream to either the first outlet or the second outlet, depending on the composition of the raw UCG product stream.

The pipe assembly can be of any suitable size, shape and construction, and can consist of any suitable material or materials. Typically the pipe assembly will comprise one or more pipes that are able to convey raw UCG product stream at elevated temperatures (above the dew point of water), pressures and velocity from the production well.

The diverter can be of any suitable size, shape and construction, and can consist of any suitable material or materials. The diverter can be a valve that is controlled manually and/or automatically, and this may be achieved in any suitable way. Manually operated diverter valves are known in the art as are electric valves electrically coupled to microprocessors.

Whether the diverter is used to divert raw UCG product stream to the first outlet or the second outlet will depend on the consistency of the raw UCG product stream. The inventors have found that a raw UCG product stream generated soon after igniting an underground coal gasifier or when decommissioning an underground coal gasifier will tend to have an unsuitable consistency (chemical or calorific) for energy or chemical production, and that the raw UCG product stream can be quite damaging to downstream product stream treatment systems. Therefore, it is extremely advantageous to be able to divert an unsuitable, damaging raw UCG product stream away from raw UCG product stream treatment systems until the underground coal gasifier produces a raw UCG product stream that is suitable.

The first raw UCG product stream treatment system can be used to treat raw UCG product stream of unsuitable consistency, such that the treated raw UCG product stream can be stored and/or safely released to the environment.

In one embodiment, the first raw UCG product stream treatment system can be a flare whereby the raw UCG product stream is ignited and released to the atmosphere. In this embodiment, a suitable inert gas (eg. nitrogen) can be used together with a suitable fuel gas (propane, natural gas or LPG, for example) to ensure:

1) a minimum oxygen concentration in the product gas below about 5% vol, and
2) a high enough calorific value gas for complete combustion of the UCG product stream.

In another embodiment, the first raw UCG product stream treatment system can be a vent scrubber, such as a wet scrubber, whereby the raw UCG product stream is bubbled through a liquid medium before being released to atmosphere.

In yet another embodiment, the first raw UCG product stream treatment system can comprise a scrubber in combination with a flare, whereby following scrubbing the raw UCG product stream is ignited and released to the atmosphere.

The second raw UCG product stream treatment system can be a particulate, water, condensed hydrocarbon or other type of removal system as described in respect of the first and second aspects of the present invention.

The first and second raw UCG product stream treatment systems, including for venting start-up gas containing high oxygen or for flaring start-up gas containing high oxygen content, can be duplicated or mobile to allow for independent start-up and decommissioning of individual gasifiers.

If desired, the apparatus itself can comprise the first and second raw UCG product stream treatment systems, as well as additional product stream treatment systems.

The pipe assembly can comprise further outlets connected to one or more other product stream treatment systems.

The apparatus can comprise a raw UCG product stream monitoring system associated with the pipe assembly and/or diverter for monitoring one or more properties of the raw UCG product stream, so as to determine whether or not the raw UCG product stream should be diverted to the first outlet or the second outlet. The monitoring system can be of any suitable size, shape and construction. The monitoring system can comprise any suitable type of sensor or sensors. For example, the sensor can sense the consistency of the raw UCG product stream or a particular constituent of the raw UCG product stream such as oxygen content or $H_2$ to CO ratio, or another type of physical parameter of the product gas such as heating value, etc.

The monitoring system can be electrically coupled to the diverter such that the diverter is operable by a microprocessor (computer-controlled). The monitoring system can comprise one or more displays and control panels, as is well known in the art.

In order that the invention may be more readily understood and put into practice, one or more preferred embodiments thereof will now be described, by way of example only, with reference to the accompanying figures.

DETAILED DESCRIPTION OF PREFERRED EMBODIMENTS

Figure 1A:
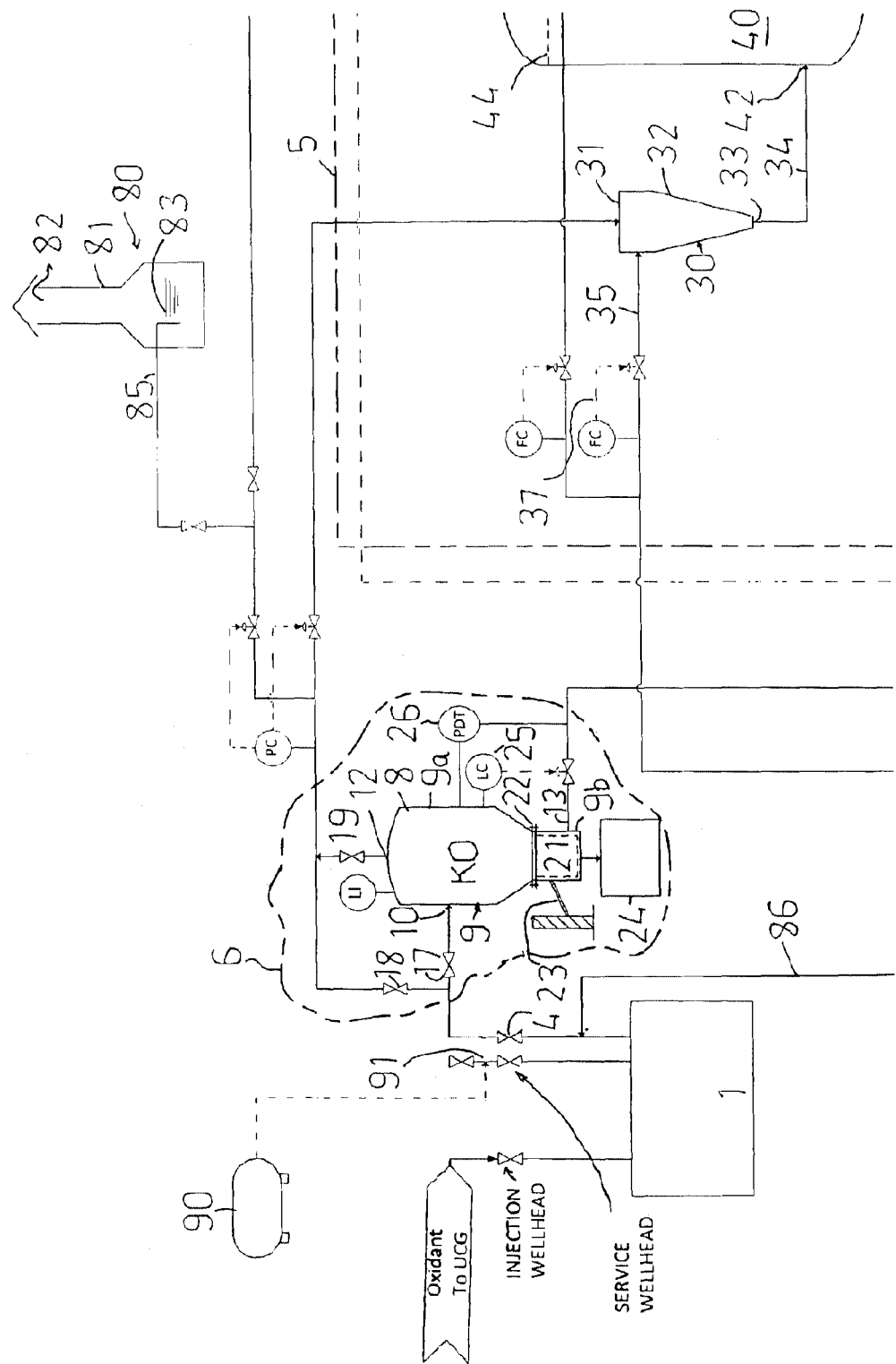
FIGS. 1A-1D depict the general steps for cooling and treating a raw UCG product stream (raw syngas) produced by an underground coal gasifier before being routed to flare or for downstream processing (eg. gas to liquid) or other usage, according to an embodiment of the present invention.
Figure 1B:
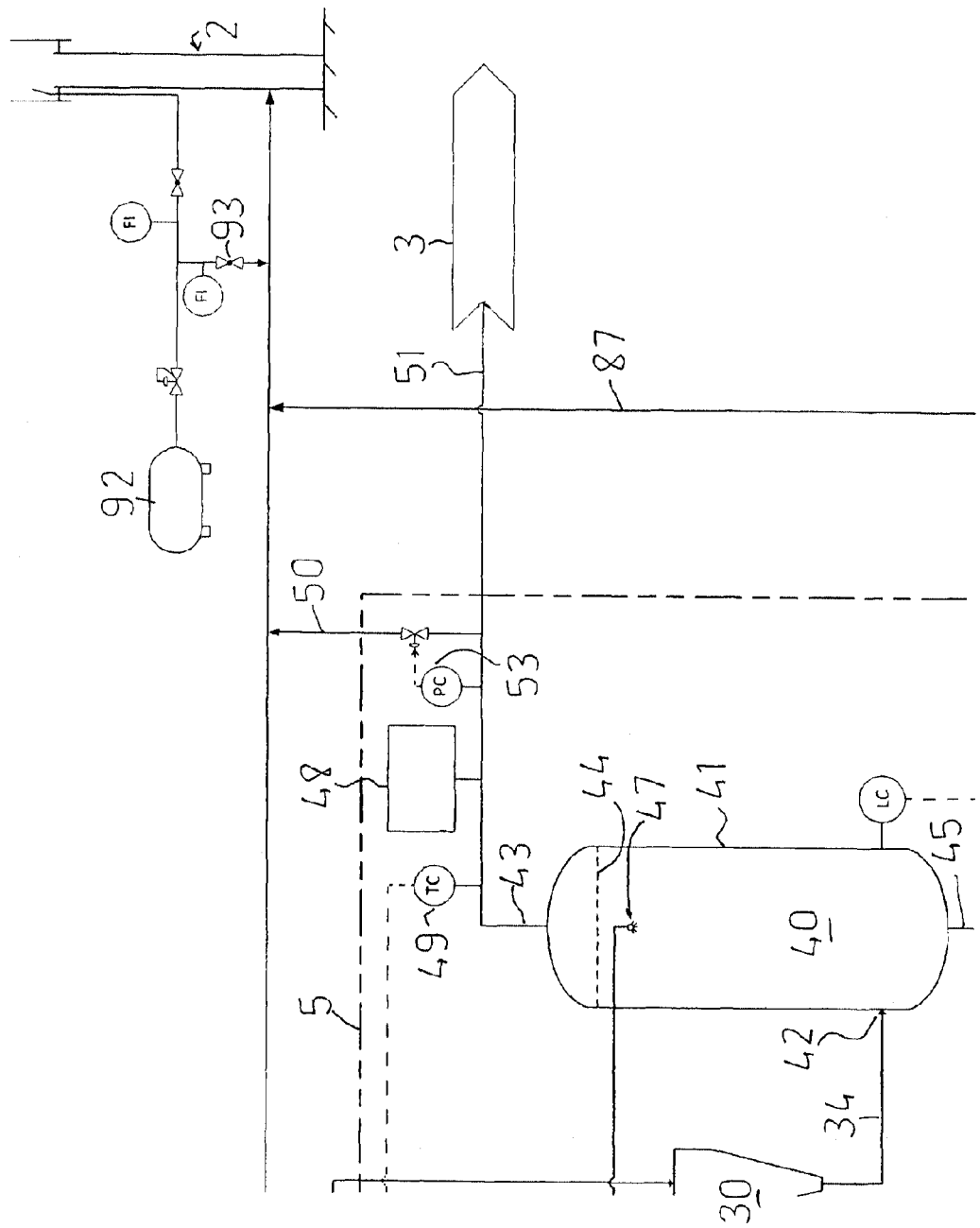
Figure 1C:
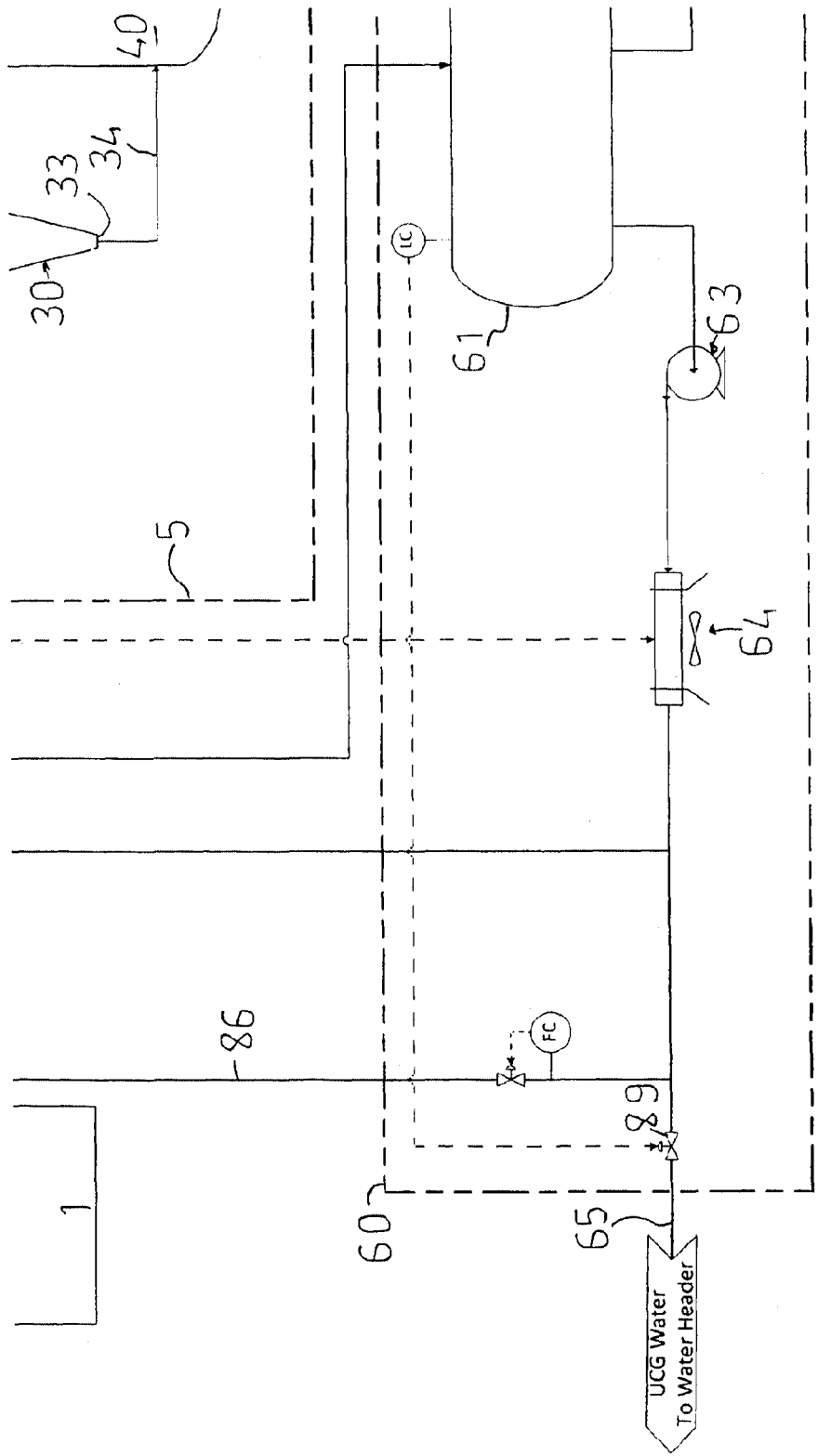
Figure 1D:
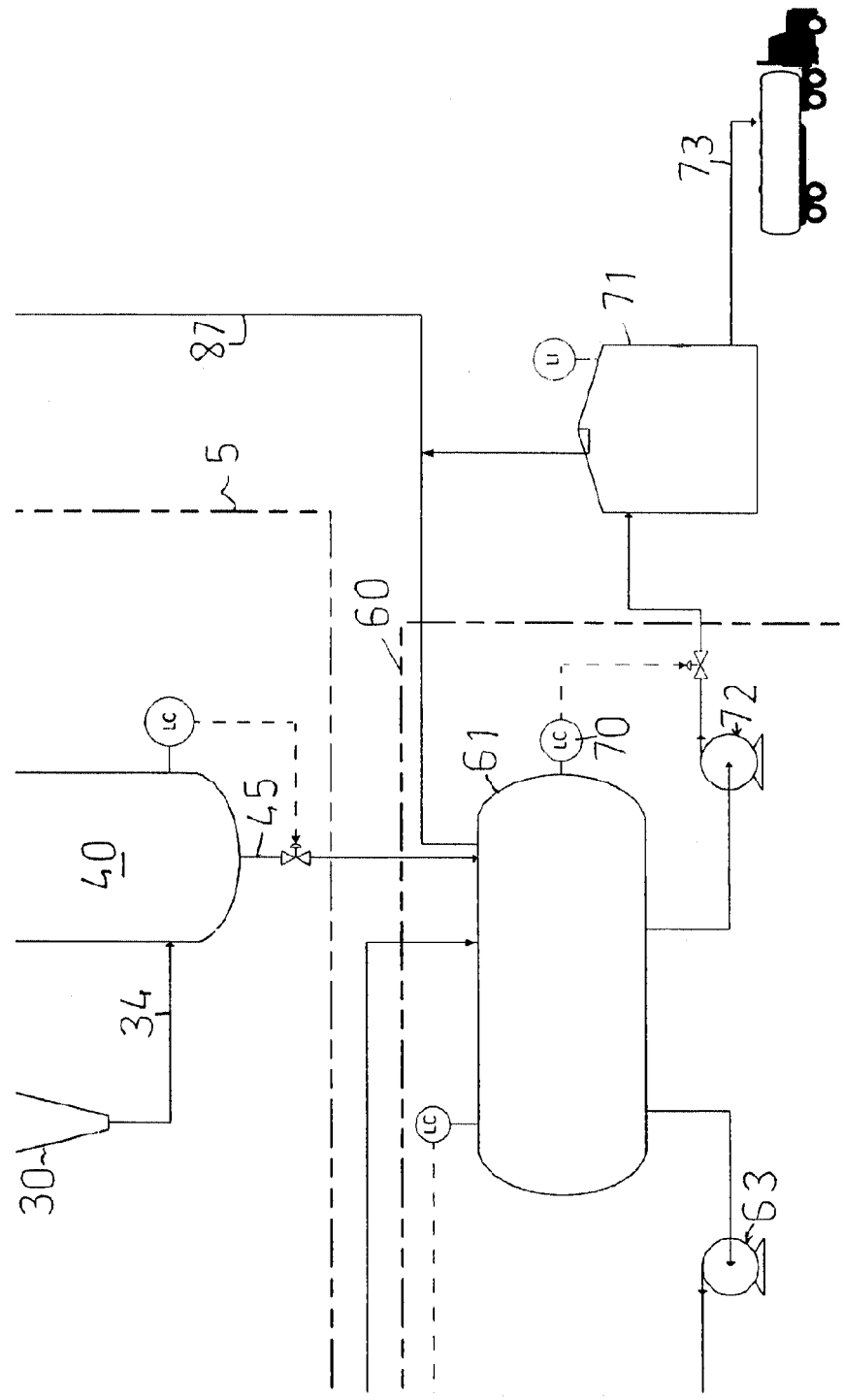

FIGS. 1A-1D depict the general steps for cooling and treating a raw UCG product stream (raw syngas) produced by an underground coal gasifier 1 before being routed to flare 2 or for downstream processing 3 (eg. gas to liquid) or other usage (eg. power generation). The figures show that the raw UCG product stream from the gasifier 1 reaches the surface at the production wellhead 4 and is either directed to a wellhead separation device 5 (boxed in a dashed line) or to a specialised start-up knock-out vessel system 6 (encircled in a dashed line) prior to being conveyed to the wellhead separation device 5.

During normal UCG operation, the raw UCG product stream is expected to contain insignificant quantities of solids (coal and rock particles) and liquids (water and coal/hydrocarbon condensate) and hence can be conveyed directly to the wellhead separation device 5 for clean-up. However, under commissioning and start-up scenarios, significant quantities of solids and liquids are usually present in the raw UCG product stream and can complicate downstream processing of the product stream, including damaging product gas processing equipment. Therefore, under such conditions, the raw UCG product stream can be first conveyed to the knock-out vessel system 6 for primary removal of solids and liquids.

In a multiple gasifier configuration the knock-out vessel system 6 can be duplicated to match the number of underground coal gasifiers 1 or configured to be mobile between a number of underground coal gasifiers 1, while the wellhead separation device 5 can serve as a common unit for a number of gasifiers 1 (referred to as a module by the inventors). The mentioned arrangement of multiple knock-out vessels 6 will enable the start-up and decommissioning of the individual underground coal gasifiers 1 while not impacting the wellhead separation device 5 operation.

Figure 2:
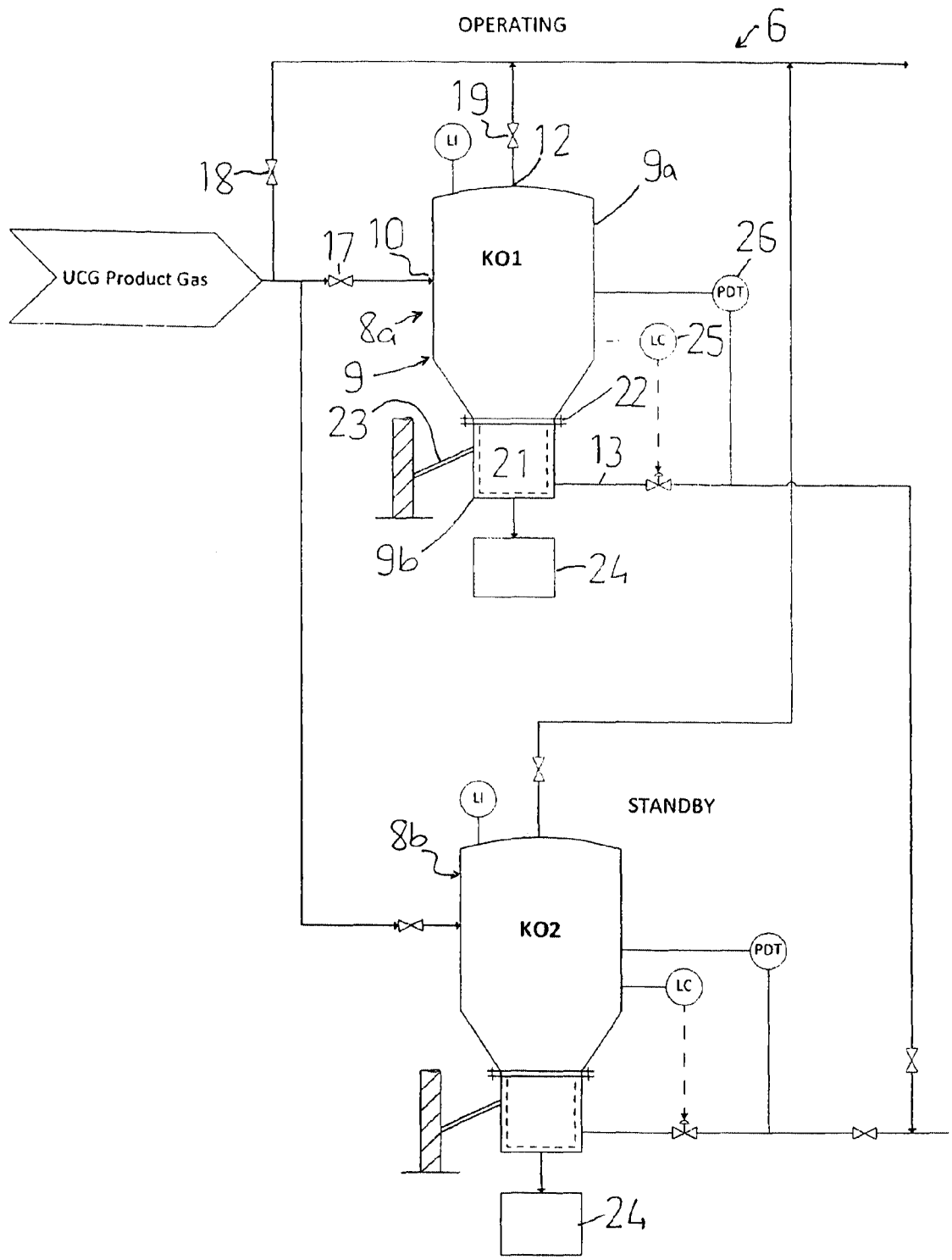
FIG. 2 shows two start-up knock out (KO) drums in closed positions but in differing modes of operation, according to an embodiment of the present invention.

As seen in FIG. 2, the knock-out vessel system 6 comprises either a single or a pair of specialised vapour-liquid/solid separators 8a, 8b (KO1, KO2) arranged in parallel, one 8a being used during underground coal gasifier 1 commissioning and the other being a standby separator 8b. This enables online change-over to the standby separator and clean out of a full separator 8 (when filled with solids).

Each separator 8 comprises a vessel 9 having a vertically orientated top section 9a sized similarly to a conventional knock-out pot and a bottom section 9b. A steel frame supporting each vessel 9 is not illustrated. Each separator 8 has a gas feed inlet 10 tangential to the vessel 9a wall to allow for centrifugal forces to enhance gas-liquid separation, or alternatively a design with an impingement plate (not shown) for directing a raw UCG product stream feed (ie. gas, liquid and solid constituents) to the vessel 9b bottom. Each separator 8 has a gas outlet 12 located at a top of the vessel 9.

Gravity causes the liquid and solid constituents of the raw UCG product stream to settle at the bottom of the vessel 9b where the liquid (water+coal condensate) is withdrawn via liquids outlet 13 located below the inlet 10. The gas constituent travels upwards at a design velocity which minimises the entrainment of any liquid droplets as the gas exits the vessel 9.

Figure 3:
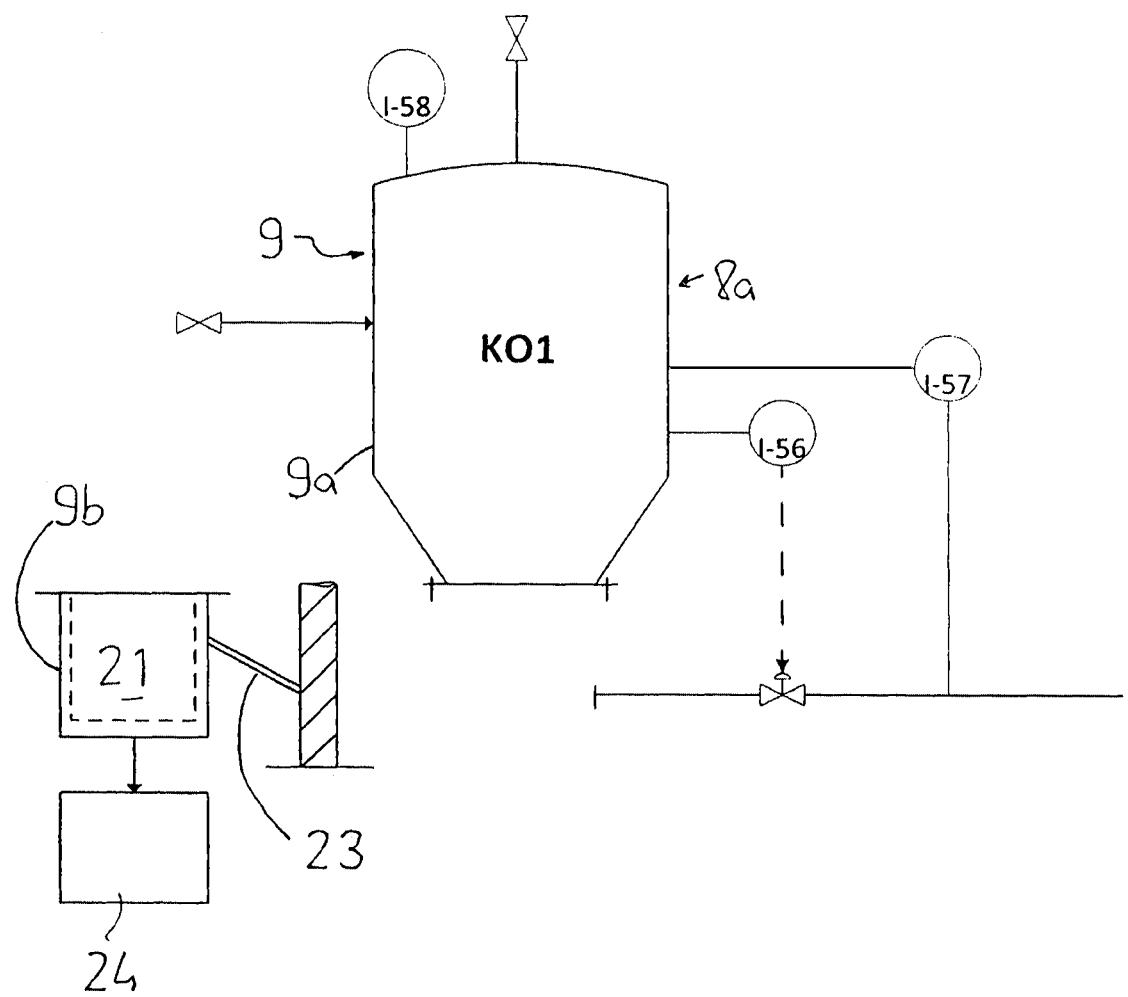
FIG. 3 shows a start-up knock out (KO) drum of FIG. 2 in an open position.

Each separator 8 also comprises a basket strainer 21 housed within the bottom section 9b. As the liquid is withdrawn on level control 25, the large solid particles are retained by the basket strainer 21. The bottom section 9b is attached to the top vessel section 9a using a quick release type flanged connection 22. Once released, a hydraulic arm 23 is able to swing the bottom section 9b into an open position to enable access to the basket strainer 21 during vessel 9 changeover, as seen in FIG. 3. Separator 8 change-over is undertaken by observing the differential pressure measurement 26 across the strainer 21 as a high pressure drop is an indication of solids build-up.

Various valves 17, 18, 19 are used to control the feed of raw UCG product stream to and from the knock-out vessel system 6. The basket strainer 21 containing the captured solids is removed from the bottom section 9b and the solids are placed into conventional 44 gallon drums 24, sealed and removed from site for disposal.

Referring now to FIGS. 1A-1D, the wellhead separation device 5 comprises a water quench and scrubber system which has the primary function of removing entrained fine particulates and liquids (water and coal/hydrocarbon condensates) from the raw UCG product stream The secondary function is to cool the raw UCG product stream by means of direct contact in order to remove more coal condensates and water from the product stream without heat exchanger fouling issues. This has the additional benefit of optimal conditions for efficient bulk aqueous-organic phase separation and removal from the system thereby reducing downstream wastewater processing. In addition, product stream/gas measurement and sampling 48 can take place under cooler, cleaner conditions thereby simplifying instrumentation and analyser requirements. Further advantages of utilizing the scrubber arrangement is that it could assist with initial product stream/gas clean-up relating to low level contaminants such as heavy metals (arsenic and mercury), chlorides (hydrogen chloride), cyanides (hydrogen cyanide), sulphur compounds ($H_2S$, COS), ammonia, trace amounts of organic compounds such as phenol, etc.

The raw UCG product stream from the underground gasifier 1 (or knock-out vessel system 6) is routed to the wellhead separation device 5 and is first contacted with water in a venturi scrubber 30 for effective particle removal. The raw UCG product stream then enters a cyclonic spray scrubber 40 before being routed to flare 2 or for further downstream processing 3.

The venturi scrubber 30 has a venturi pipe 31 comprising a converging section 32, a throat section 33 and a diverging section 34. Water is injected via a water supply line 35 into the venturi pipe 31 just prior to the throat section 33. The raw UCG product stream entering the converging section 32 comes in contact with the injected water of supply line 35 and mixes with the water droplets to removed particulates from the product stream prior to the product stream reaching the cyclonic spray scrubber 40. A flow control system 37 controls the injection of water into the venturi pipe 31.

The cyclonic spray scrubber 40 comprises a vertically orientated vessel 41 as well as a gas feed inlet 42 at a bottom of the vessel 41 that is connected to the venturi pipe diverging section 34. The cyclonic spray scrubber 40 has a gas outlet 43 located at a top of the vessel 41 for a spray scrubber-separated product stream. The cyclonic spray scrubber 40 has a demister/grid pad 44 located at the outlet 43 for removing entrained water droplets. The cyclonic spray scrubber 40 also has a liquid outlet 45 located at the bottom of the vessel 41 for conveying knocked out liquids to a three-phase separator system 60.

The cyclonic spray scrubber 40 comprises a spray system 47 for further cooling of the UCG product stream as it swirls upwardly from the inlet 42 to the outlet 43. Further cooling removes more contaminants from the product gas stream. The spray system 47 has a manifold and nozzles for spraying water towards the vessel 41 walls and swirling gas, so that contaminants captured within the spray are directed down towards the vessel's 41 bottom. The cyclonic spray scrubber 40 comprises a temperature control 49 whereby exiting gas temperature determines the required duty of air coolers 64 by adjusting the fan speed.

The exiting gas is then subjected to gas analysis 48 and either routed to flare 2 via a flare line 50 or for downstream processing 3 (eg. a GTL facility) via a feed line 51. The flare 50 and feed lines 51 are under pressure control 53.

The three phase separator system 60 comprises a liquid-liquid separator drum 61 for bulk aqueous-hydrocarbon phase separation. Dissolved gases in the drum 61 are flashed off to flare 2 via a flare line 87 extending from a top of the drum 61.

The separated aqueous phase is pumped using a circulation pump 63 and cooled using a temperature controlled air cooler 64 before being recycled to the venturi water supply line 35 or manifold of the sprinkler system 47. Excess water is purged from the liquid-liquid separator drum 61 via level control valve 89 to the production well 4 for cooling using return line 86 with the remainder routed to downstream water treatment system 65. Alternatively, all purge water from the system 60 can be routed to water treatment system.

Light coal condensate is pumped 72 on level control 70 to a tank 71 for storage and dispatch 73. Heavy coal condensate and particulates accumulating in a first compartment of the liquid-liquid separator drum 61 are periodically moved into storage drums (not shown), or can be recombined with the light coal condensate.

Under commissioning/start-up conditions, the raw UCG product stream produced in an underground gasifier 1 may contain high levels of oxygen unacceptable for flaring 2. Under certain legislation and conditions, such gas can be routed to atmosphere via a vent system 80 (for about 1 hour) until the oxygen level is acceptable for flaring or downstream process.

The vent system 80 comprises a vertically orientated vessel 81, a gas outlet 82 at an upper region of the vessel 81, a liquid seal arrangement 83 at a bottom of the vessel 81, and a gas inlet 85 for feeding incoming gas into the liquid sealing arrangement 83. That is, the gas inlet 85 can have a nozzle submerged below, say, 10 cm of water of the liquid sealing arrangement 83 so as to prevent flame propagation back into the wellhead separation device 5 in the event of a fire at the gas outlet 82. Once the oxygen content in the raw product stream decreases to below the acceptable limit, the product stream is diverted to the flare 2 or downstream process.

In other instances, where no atmospheric venting is permitted, an inert gas (eg Nitrogen) can be used to dilute the oxygen in the UCG combustion product to an acceptable level for flaring. An ISO container 90 of N2 is placed close to a service well of the underground gasifier 1 and connected to the wellhead 91. Just prior to ignition, N2 is injected downhole to dilute the gas downstream of the ignition point to an acceptable oxygen level.

In order to increase the heating value of the gas from 1, fuel gas 92 is similarly injected into the gas stream 93 prior to the flare 2 inlet. The fuel increases the heating value of the gas to ensure the minimum destruction efficiency of 98% is achieved. In this way, both safe handling of oxygen containing syngas and complete combustion of said syngas is achieved.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to publications cited in this specification is not an admission that the disclosures constitute common general knowledge.

The invention claimed is:

1. An apparatus for treating raw syngas generated by underground coal gasification (UCG), comprising:
   a) a separator for separating liquids and solids from the raw syngas generated by UCG, comprising:
      (i) a vessel having a top section and a bottom section;
      (ii) a gas feed inlet;
      (iii) a gas outlet located above the gas feed inlet;
      (iv) an outlet for liquids located below the gas feed inlet; and
      (v) a basket strainer housed within the bottom section of the vessel, wherein the bottom section of the vessel receives the separated liquids and solids; and
   b) a vent system for routing raw syngas containing high levels of oxygen to atmosphere, the vent system comprising:
      (i) a vertically orientated vessel;
      (ii) a gas outlet at an upper region of the vessel;
      (iii) a liquid sealing arrangement at the bottom of the vessel; and
      (iv) a gas inlet for feeding incoming syngas into the liquid sealing arrangement.

2. The apparatus of claim 1, wherein the gas feed inlet is tangential to a wall of the top section of the vessel.

3. The apparatus of claim 1, wherein the top section of the vessel is detachably connected to the bottom section of the vessel.

4. The apparatus of claim 3, wherein the top section of the vessel is detachably connected to the bottom section of the vessel using a quick release type flanged connection.

5. The apparatus of claim 3, further comprising a hydraulic arm connected to the bottom section of the vessel, the hydraulic arm moving the bottom section of the vessel relative to the top section of the vessel between open and close positions.

6. The apparatus of claim 1, wherein the separator further comprises an internal impingement plate.

7. The apparatus of claim 1, comprising two separators, arranged in parallel.

8. A method of separating liquids and solids from raw syngas generated by underground coal gasification, comprising the step of passing the raw syngas through a separator, wherein the separator comprises:
   a) a vessel having a top section and a bottom section;
   b) a gas feed inlet;
   c) a gas outlet located above the gas feed inlet;
   d) an outlet for liquids located below the gas feed inlet; and
   e) a basket strainer housed within the bottom section of the vessel, wherein the bottom section of the vessel receives the separated liquids and solids.

9. The method of claim 8, further comprising the step of routing raw syngas containing high levels of oxygen to atmosphere, wherein the raw syngas is routed to atmosphere via a vent system, the vent system comprising:
   a) a vertically orientated vessel;
   b) a gas outlet at an upper region of the vessel;
   c) a liquid sealing arrangement at the bottom of the vessel; and
   d) a gas inlet for feeding incoming syngas into the liquid sealing arrangement.

10. A method for treating a raw underground coal gasification (UCG) product stream, comprising the steps of:
    a) connecting an inlet of a pipe assembly to a production well of an underground coal gasifier;
    b) connecting a first outlet of the pipe assembly to a first raw UCG product stream treatment system selected from the group consisting of a flare, a vent scrubber, and a vent scrubber in combination with a flare;
    c) connecting a second outlet of the pipe assembly to a second raw UCG product stream treatment system, comprising:
       (i) a separator for separating liquids and solids from the raw UCG product stream; and
       (ii) a vent system for routing raw syngas containing high levels of oxygen to atmosphere; and
    d) using a diverter associated with the pipe assembly to divert the raw UCG product stream to either the first outlet or the second outlet, depending on the composition of the raw UCG product stream.

11. The method of claim 10, wherein the first raw UCG product stream treatment system is a flare whereby the raw UCG product stream is ignited and released to the atmosphere, and wherein an inert is used together with a suitable fuel gas to ensure:
    a) a minimum oxygen concentration in the UCG product stream is below about 5% volume; and
    b) a high enough calorific value gas for complete combustion of the UCG product stream.

12. The method of claim 10, wherein the separator comprises:
    a) a vessel having a top section and a bottom section;
    b) a gas feed inlet;
    c) a gas outlet located above the gas feed inlet;
    d) an outlet for liquids located below the gas feed inlet; and
    e) a basket strainer housed within the bottom section of the vessel, wherein the bottom section of the vessel receives the separated liquids and solids.

13. The method of claim 10, wherein the vent system comprises:
    a) a vertically orientated vessel;
    b) a gas outlet at an upper region of the vessel;
    c) a liquid sealing arrangement at the bottom of the vessel; and
    d) a gas inlet for feeding incoming syngas into the liquid sealing arrangement.

* * * * *